March 20, 1962
A. R. McLERRAN ET AL
3,025,872
LIQUID LEVEL CONTROL APPARATUS
Filed June 28, 1957
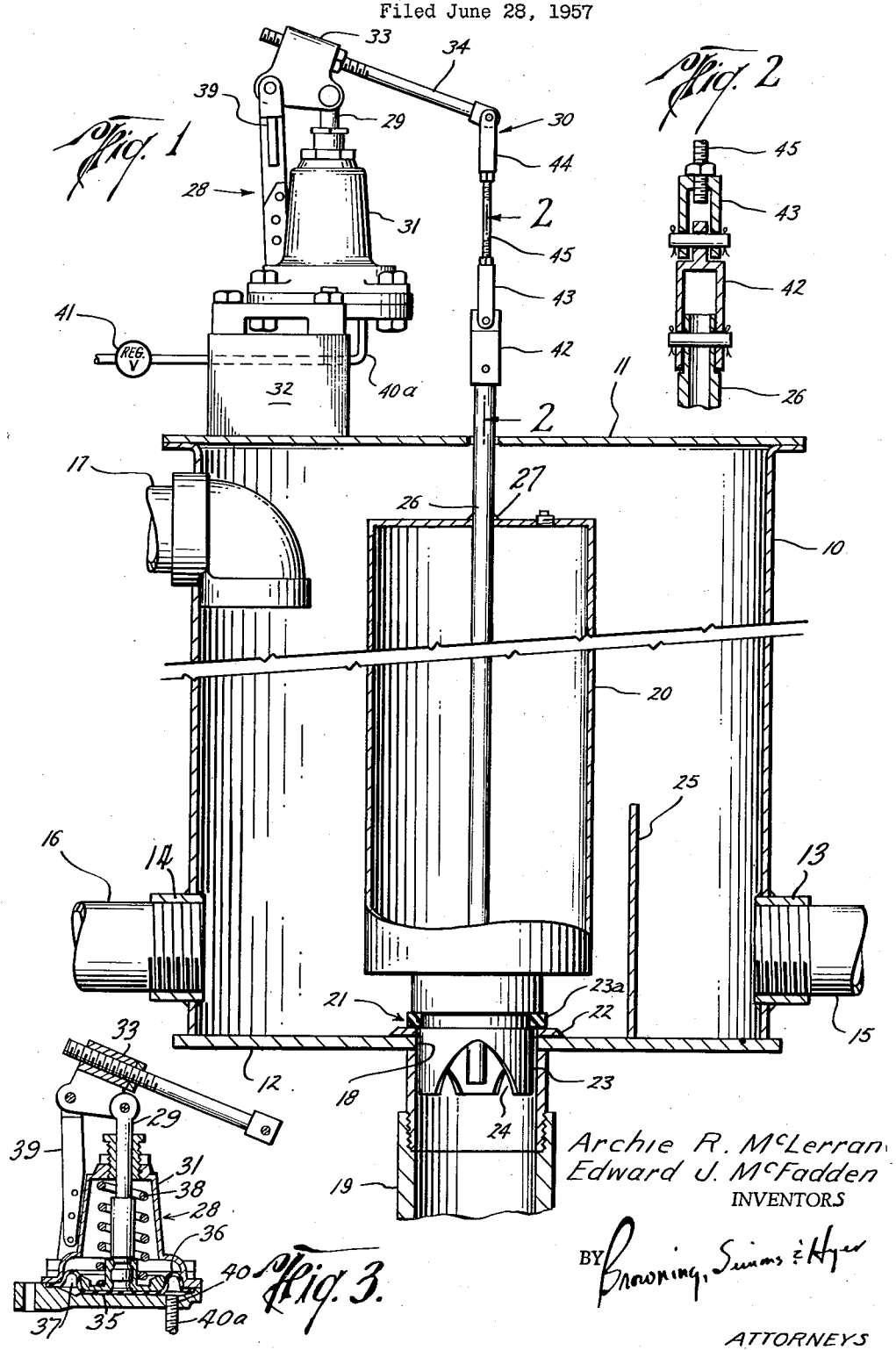
Archie R. McLerran
Edward J. McFadden
INVENTORS
BY Browning, Simms & Hyer
ATTORNEYS

# United States Patent Office 3,025,872
Patented Mar. 20, 1962

3,025,872
LIQUID LEVEL CONTROL APPARATUS
Archie R. McLerran and Edward J. McFadden, Beaumont, Tex., assignors, by mesne assignments, to Dresser Industries, Inc., Dallas County, Tex., a corporation of Delaware
Filed June 28, 1957, Ser. No. 668,782
2 Claims. (Cl. 137—398)

This invention relates broadly to apparatus for maintaining liquid at a substantially constant level within a container. More particularly, it relates to such apparatus which is adjustable in a manner to permit the liquid to be maintained at ony one of a number of substantially constant levels.

Apparatus of this general type is useful in controlling the level of liquid within a Hydromatic brake. For this and other purposes, it comprises a tank having an inlet thereto from a suitable source of liquid and an outlet therefrom connecting with the casing of the brake for supplying the liquid thereto. The liquid level within the tank, and thus within the brake casing, is controlled by means of a port from the tank and a float within the tank having a valve member thereon for closing the port. The float and valve member will be raised to open the port in response to a predetermined level of liquid within the tank, which is dependent upon the buoyancy of the float and its position above the port from the tank. As the liquid flows out through the open port and it drops to such predetermined level, the float and valve member will be lowered to again close the port. In this manner, the liquid is maintained at a substantially constant level.

Inasmuch as the braking effort is dependent upon the level of the liquid within the brake casing, it is desirable to provide such apparatus with means for adjusting the substantially constant level at which the liquid will be maintained within the container.

It is an object of this invention to provide such apparatus which is adjustable to maintain liquid at practically any substantially constant level within the tank, and thus within the container.

It is a more particular object to provide such adjustability without the use of threads or other parts within the tank which are susceptible to corrosion.

Another object is to provide liquid level control apparatus of this general type having a tank from which sand or other debris is quickly drained.

Other objects, advantages and features of this invention will be apparent to one skilled in the art upon a consideration of the written specification, the attached claims and the annexed drawings.

The apparatus of the present invention includes a float within the tank which extends substantially the entire height thereof, and means for adjusting the buoyance of the float so that it may be lifted to open the port from the tank in response to practically any desired level of liquid within the tank. Thus, the apparatus is adjustable in a manner to maintain such liquid at practically any substantially constant level within the tank.

More particularly, the port is from the bottom of the tank such that sand or other debris will drain quickly from the tank upon opening of the port, and the buoyancy adjusting means comprises a stem on the float extending through a wall of the tank and means exteriorly of the tank for applying a load to the stem. This latter construction eliminates the necessity of threads or other parts subject to corrosion within the tank.

In the drawings, wherein like reference characters are used throughout to designate like parts:

FIG. 1 is a view, partly in section and partly in elevation, of one embodiment of the apparatus of the present invention;

FIG. 2 is a detailed sectional view, as seen along broken line 2—2 of FIG. 1, of part of the connection between the stem on the float and an actuator for loading the stem of the float; and FIG. 3 is a sectional view of the actuator.

In the FIG. 1, an upright, cylindrical tank 10 having top and bottom walls 11 and 12, respectively, is provided an inlet 13 thereto and an outlet 14 therefrom adjacent the bottom wall 12. A conduit 15 may be connected within the inlet 13 for supplying a liquid to the interior of the tank, and a conduit 16 may be connected with the outlet 14 for conducting liquid within the tank into the casing of a brake or other container in which a substantially constant level of the liquid is to be maintained. It is contemplated that such a brake may correspond substantially to that illustrated on pages 4103–4 of the 1955–56 edition of the Composite Catalog of Oil Field and Pipeline Equipment. When used in the manner contemplated, the tank 10 may be provided with another opening therethrough to receive a conduit 17 for returning the overflow of liquid from the brake casing to the tank. In any case, the tank should be a height at least as great as that of the container so as to provide at least as wide a range of adjustability in the container as exists in the tank.

Connected to a port 18 from the bottom wall 12 of the tank is a conduit 19 for conducting liquid emptied into the port to a suitable point of disposal, which may be the source of supply from which liquid is conducted by conduit 15 into the tank inlet 13. A float 20 within the tank 10 may be of well known hollow, cylindrical construction and, as previously mentioned, of a height approximately that of the tank. Secured to the lower end of the float is a valve member 21 for closing the port 18 in the lowermost position of the float. With the port closed by the valve member, in a manner to be described, the level of liquid entering the tank through inlet 13 and the brake or other container through outlet 14 will rise. When, however, this level of liquid rises an amount sufficient to raise the float 20, the valve member 21 will be lifted to open the port 18. As liquid within the tank flows outwardly through the port to lower the level thereof within the tank and container, the float and valve member 21 will be lowered to again close the port.

The inner end of the port 18 is surrounded by an annular seat 22, and the valve member 21 is provided with a skirt 23 which is guidably received within the port and an annular resilient sealing element 23a carried by the valve member above the skirt for seating upon the seat 22 in the closed position of the valve member. As shown in FIG. 1, the skirt 23 is provided with upwardly convergent openings 24 for gradually increasing the rate of flow of the liquid within the tank into the port 18 as the valve member is lifted from its closed position. It is contemplated that the longitudinal travel of the float will not be sufficient to raise skirt 23 out of the port 18.

Extending across the bottom wall 12 of the tank intermediate inlet 13 and port 18 is a baffle plate 25. This plate prevents the incoming fluid from flowing directly into the open port, and also directs such liquid toward the overflow conduit 17 so as to cool the liquid returning from the brake.

The means for adjusting the buoyancy of the float 20 comprises a stem 26 secured as by welding at 27 to the float, and means 28 exteriorly of the tank for applying a load to the stem. The stem may be hollow and extend through the float and into the skirt 23 of the valve member, as shown in FIG. 1, so as to vent the conduit 19 to the atmosphere.

In this particular embodiment of the invention, the load applying means 28 comprises a conventional type of actuator in the form of a spring-pressed, air-controlled rod 29 having a force-transmitting connection 30 with the upper end of the stem. As shown in FIGS. 1 and 3, the rod extends through the upper end of a housing 31 supported on a bracket 32 mounted on the top wall 11 of the tank. The upper end of the rod 29 which projects outwardly from the housing 31 is pivotally connected to a part 33 which is, in turn, threadedly connected to an arm 34. The lower end of the rod within the housing 31 is provided with a disc or plate 35 which engages a diaphragm 36 arranged within the housing to define a variable capacity pressure chamber 37 therein.

The rod 29 is urged to a retracted position by means of a coil spring 38 acting between the upper end of the housing and the disc 35, and an arm 39 connects the housing 31 to part 33 on a side of the rod 29 opposite connection 30 so that, as can be seen from FIG. 1, the spring 38 urges the float and valve member 21 into a position closing the port 18. This load upon the stem 26 is opposed by means of air pressure admitted to the pressure chamber 37 through inlet 40 for acting upon the lower side of the diaphragm 36.

As shown in FIG. 1, a line 40a may connect the inlet with a suitable source of compressed air, and a valve 41 may be disposed within the line for regulating the pressure at which the air is admitted to the chamber 37. When this air pressure is decreased, the load on stem 26 will be increased so as to raise the substantially constant level at which the liquid will be maintained. On the other hand, when this pressure is increased, the load on the stem is decreased so as to lower the substantially constant level at which the liquid will be maintained. Obviously, air may be supplied within a range of pressures for maintianing the liquid at practically any substantially constant level between the upper and lower ends of the container.

As shown in FIG. 1, and in detail in FIG. 2, the arm 34 is connected to the stem 26 in a manner to permit longitudinal movement of the stem relative to the rod 29 and arm 34. This connection comprises a clevis 42 on the upper end of the stem 26 and yokes 43 and 44 connected at their outer ends to the clevis 42 and arm 34, respectively, and threaded at their inner ends to a rod 45. The various parts of the force-transmitting connection are adjustable in a manner apparent from FIG. 1 of the drawings.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for controlling the amount of liquid within a Hydromatic brake or the like which comprises an elongate upright tank having a circulating liquid outlet adjacent the bottom of the tank, a circulating liquid return above the circulating liquid outlet, said tank having a drain port in its bottom and a fresh liquid inlet, a float within the tank and having a length so as to extend substantially the entire vertical height of the tank, a valve member connected to the float and controlling flow through the drain port responsive to vertical movement of the float, a stem on the float extending through an upper cover for the tank, a housing on the tank, a pressure responsive member in the housing, a rod engageable with the pressure responsive member and extending through a wall of the housing, spring means urging said member in one direction, fluid pressure means including an inlet to the housing for urging said member in the opposite direction, and an arm connecting said stem to said rod for movement responsive to one another.

2. An apparatus for controlling the amount of liquid within a Hydromatic brake or the like which comprises an elongate upright tank having a circulating liquid outlet adjacent the bottom of the tank, a circulating liquid return above the circulating liquid outlet, said tank having a drain port in its bottom and a fresh liquid inlet, a float within the tank and having a length so as to extend substantially the entire vertical height of the tank, a valve member connected to the float and controlling flow through the drain port responsive to vertical movement of the float, a stem on the float extending through an upper cover for the tank, a housing on the tank, a pressure responsive member in the housing, a rod engageable with the pressure responsive member and extending through a wall of the housing, connecting means for moving said stem responsive to movement of said float, means biasing said pressure responsive means to a first position, including at least the weight of the float, the stem, the rod, and said connecting means, and fluid pressure means including an inlet to the housing for urging said member to a second position.

References Cited in the file of this patent

UNITED STATES PATENTS

| | | |
|---|---|---|
| 573,556 | Thompson et al. | Dec. 22, 1896 |
| 747,514 | Tozier | Dec. 22, 1903 |
| 1,906,277 | McGee | May 2, 1933 |
| 2,078,106 | Temple | Apr. 20, 1937 |
| 2,172,647 | Widman | Sept. 12, 1939 |
| 2,540,361 | Whitley | Feb. 6, 1951 |